March 19, 1957  R. P. BALLOU  2,786,162
CIRCUIT BREAKER SERVICE EQUIPMENT
Filed March 6, 1951  3 Sheets-Sheet 1
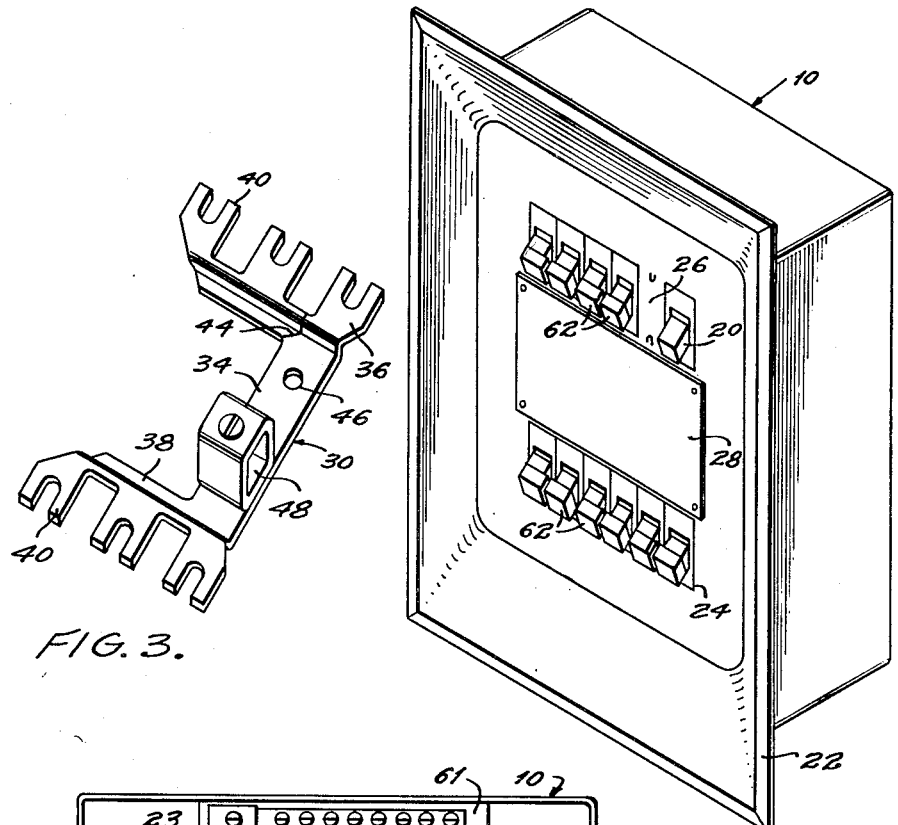
FIG. 3.
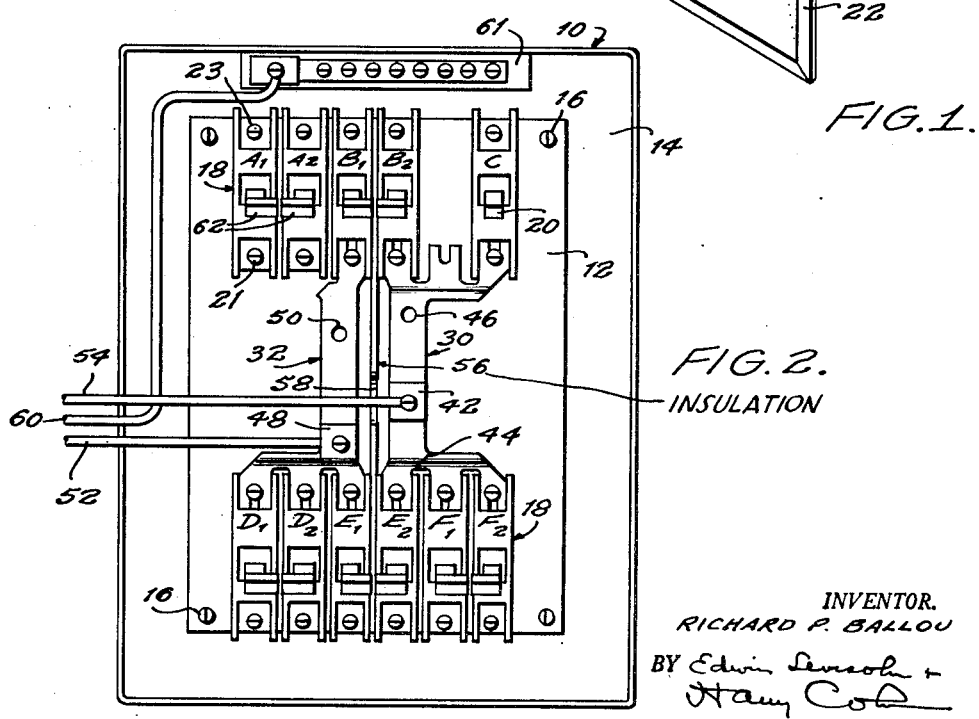
FIG. 1.
FIG. 2.
INVENTOR.
RICHARD P. BALLOU
BY Edwin Lensohn +
Harry Cole
ATTORNEYS March 19, 1957     R. P. BALLOU     2,786,162
CIRCUIT BREAKER SERVICE EQUIPMENT Filed March 6, 1951     3 Sheets-Sheet 2

INVENTOR.
RICHARD P. BALLOU
BY
ATTORNEYS

March 19, 1957 R. P. BALLOU 2,786,162
CIRCUIT BREAKER SERVICE EQUIPMENT
Filed March 6, 1951 3 Sheets-Sheet 3

INVENTOR.
RICHARD P. BALLOU
BY
ATTORNEYS

United States Patent Office 2,786,162
Patented Mar. 19, 1957

2,786,162

CIRCUIT BREAKER SERVICE EQUIPMENT

Richard P. Ballou, Hartford, Conn., assignor to Federal Electric Products Company, Newark, N. J., a corporation Application March 6, 1951, Serial No. 214,122

1 Claim. (Cl. 317—119)

The present invention relates in general to service equipment of the type which is used as the disconnecting and overcurrent protective means for electric service at the point of entrance of the utility company power lines into a building.

It is customary for service control apparatus of this type to be wired and assembled at the factory in accordance with specifications submitted by the customer to accommodate a particular electric wiring installation. However, it frequently becomes necessary for the electrician to change the construction or arrangement of the service control apparatus prior to the actual installation thereof or after said installation. Therefore, it is a primary object of my invention to permit this to be accomplished by the customer in a very simple manner by changing only one element in the assembly.

Pursuant to the requirements of the National Electric Code and the Underwriters' Laboratories, Inc., it is necessary that the service control equipment, in addition to providing over-current protective means for the electrical services in a building, also provide means for disconnecting the complete electric service to the building at the point of entrance of said service. Heretofore, it was necessary to provide a separate disconnect switch to comply with said requirements. Therefore, another object of my invention is to eliminate the necessity for a separate disconnect switch by providing the equivalent thereof in the service control equipment.

Another object of my invention is to provide service entrance equipment which may be used as a load center to supply several branch circuits which originate from a feeder away from the point of entrance of the utility service.

A further object of the invention is to provide service entrance equipment which has a maximum of six subdivisions, as presently permitted by the National Electric Code, so that no main circuit breaker in excess of 50 amperes is required, a main circuit breaker being completely eliminated for some of the circuits.

A further object is the provision of circuit breaker service equipment of a generally improved character.

The above and other objects, features and advantages of the present invention will be more fully understood from the following description considered in connection with the accompanying illustrative drawings.

In the drawings:

Fig. 1 is a perspective view of an enclosure provided with circuit breaker service equipment pursuant to the present invention;

Fig. 2 is a plan view of the enclosure illustrated in Fig. 1, with the cover thereof removed for purposes of illustration;

Fig. 3 is a perspective view of a bus bar, of a presently preferred form which is used in the equipment illustrated in Fig. 2;

Figure 4:
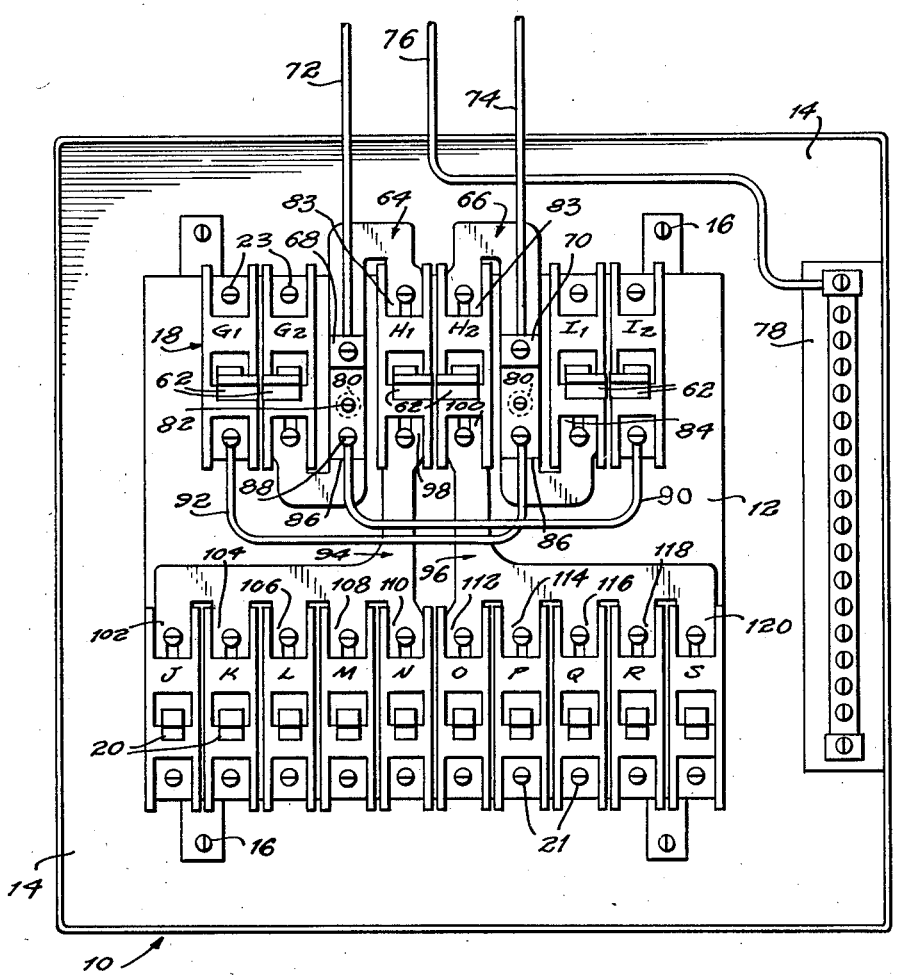
Fig. 4 is a view similar to Fig. 2 illustrating another embodiment of the invention.

In the following description and claims, the expression "unipolar double-pole circuit breaker" refers to a dual circuit breaker arrangement wherein each pole, as connected in a circuit, has the same polarity. The expression "bipolar double-pole circuit breaker" is utilized to indicate a dual circuit breaker arrangement, wherein the poles, as connected in a circuit, are of opposite polarity.

Referring now to Figs. 1, 2 and 3 of the drawings, there is shown an enclosure 10 for the circuit breaker service control equipment. As here shown, said enclosure is provided with a mounting plate or pan 12 which is secured to the rear wall 14, thereof in any suitable manner, such as for example by means of the screws 16. The circuit breakers 18 may be of any suitable type, and do not per se constitute part of the present invention. Said circuit breakers are removably mounted on the panel 12 in any suitable manner and are provided with the usual handles or manual operating members 20, a line terminal connector 21 and a load terminal connector 23. As here shown, the enclosure 10 is provided with a front closure and trim member 22 having cutouts 24 through which the circuit breaker handles project for the operation thereof. Where a cutout is not used, it may be readily covered by any form of closure plate, such as indicated at 26. A name plate 28 is provided on the front of the removable closure 22.

In the arrangement illustrated in Figs. 1 and 2, provision is made for eleven single-pole circuit breakers 18 and for the bus bars 30 and 32, respectively. The bus bars are preferably formed of flat strips of copper or other suitable material. Referring now specifically to bus bar 30, said bus bar comprises the body portion 34 (Fig. 3) and the end portions 36 and 38, respectively, at the opposite ends thereof. Each end portion is provided with a plurality of terminal connector portions 40 for connection to the circuit breaker line terminal connectors 21, and in the illustrated form of bus bar 30, there are three terminal connector portions at each end thereof. It will be noted that said terminal connector portions are disposed symmetrically about the center line of the bus bar 30. The bus bar is also provided with a main line terminal connector 42 which is mounted on the body portion 34 and which is offset from the center line thereof. In addition, the bus bar 30 is provided with a score line illustrated at 44 for breaking off certain of the branch line terminal portions 40. As illustrated in Fig. 3, the score line is positioned so that two of the branch terminals may be removed from the end part 36. However, it will be understood that it is within the scope of the present invention to provide the score line at other portions of the bus bar 30 than that illustrated, as well as to provide additional score lines so that any desired number of end terminals thereof may be removed from either end of the bus bar to provide for a particular circuit arrangement. It will be noted that since the end terminals 40 are symmetrical about the center line of the bus bar 30, the latter may be turned end for end in its own plane for incorporation into the service equipment, thereby eliminating the necessity for separate right or left bus bars. Further in this connection, it will be noted that if bus bar 30 is broken at score line 44 and then rotated end for end in its own plane from the position thereof illustrated in Fig. 2, the resultant bus bar will be identical with the bus bar 32, as positioned in the mechanism of Fig. 2. Therefore, it will be apparent that the bus bar 32 is formed from a bus bar 30 by breaking away a portion of the latter. It will be noted that the bus bar 30 is apertured as at 46 so that when broken at 44 and rotated in its own plane end to end to provide the bus bar 32, said aperture 46 will be available for receiving the main line terminal connector 48 of the bus bar 32, the aperture used for mounting the line terminal connector 42 on bus bar 30 being illustrated at 50 in the bus bar 32. Therefore, it will be apparent that each bus bar 30 and 32 is provided with two apertures, each offset an unequal distance from the center line thereof for accommodating a main line terminal in either position of the bus bar. In this connection it will be noted that in the arrangement illustrated in Fig. 2, one main service line 52 of a three wire electric circuit from the utility company is connected to the main line terminal 48 on bus bar 32 and another main line 54 is readily connected to the main line terminal 42 of the bus bar 30, said lines being laterally spaced from each other for ready identification and assembly in the apparatus. As here shown, the bus bars 30 and 32 are separated by an insulating member 56 which is cut out, as at 58, to provide for the ready connection of the main line 54 to the main terminal 42. It will be understood that the conductors 52 and 54 constitute the two high voltage lines of a three wire single phase circuit, to provide 115/230 volts, the third conductor thereof being indicated at 60 and being connected to a neutral or ground terminal bar 61 provided on the wall of the enclosure 10.

Having removed two end terminal portions from one end of bus bar 32, it will be apparent that the two circuit breakers indicated at A1 and A2 are not connected to the main bus bar 32 and therefore are available for use in a separate circuit. Such a circuit is commonly required for an off-peak water heating circuit which may be connected to a time switch in the electric service meter. However, it will be apparent that if such a separate circuit is not desired, bus bar 32 would be replaced by a bus bar identical to bus bar 30 which would be turned end for end in its own plane from the position of bus bar 30 in Fig. 2 and installed in place of the bus bar 32. Such a bus bar is illustrated in Fig. 3, it being noted that said bus bar is structurally the same as the bus bar 30 in Fig. 2 but rotated 180° in its own plane and is provided with the main line terimnal connector 48 in position to receive the conductor 52.

By providing each of adjacent single-pole circuit breakers with a handle extension 62, for example as shown on circuit breakers A1 and A2 in Fig. 2, the companion handle extensions may be grasped simultaneously for the concomittant manual operation of the pair of circuit breakers. In this respect, each pair of circuit breakers which is provided with the handle extensions 62, becomes the equivalent of a two pole circuit breaker, as interpreted by the National Electric Code. Where each of the circuit breakers of such a pair, when connected in a circuit, are of opposite polarity, they constitute the previously described bipolar double-pole circuit breaker, such as indicated by the circuit breakers B1—B2. and by the circuit breakers E1—E2. More specifically, it will be noted that the circuit breakers B1 and E1 are connected through end terminals of bus bar 32 to main line conductor 52 of the three wire utility supply circuit and that circuit breakers B2 and E2 are connected through end terminals of bus bar 30 to the conductor 54 of said circuit, said conductors being of opposite polarity. Similarly, if the circuit breakers A1 and A2 are connected to a separate circuit, as previously described, they would also be of opposite polarity. Therefore, in the arrangement illustrated in Fig. 2, circuit breakers A1—A2, B1—B2, and E1—E2 would constitute bipolar double-pole circuit breakers controlling a 115/230 volt three wire, or a 230 volt two wire electric service circuit, as the case may be. However, it will be noted that circuit breakers D1—D2 are both connected in common to the bus bar 32, and that the circuit breakers F1—F2 are both connected in common to the bus bar 30. Therefore, each of these latter pairs of circuit breakers constitute the previously described unipolar double-pole circuit breaker, each of which controls two 115 volt two wire circuits. The use of a unipolar double-pole circuit breaker in this manner is an acceptable method of wiring which complies with the requirements of the National Electric Code. In addition, it will be noted that this method of wiring offers various advantages of safety. This safety feature results from the fact that circuits connected to circuit breakers D1—D2 or F1—F2 are each derived from a point of common polarity on either the bus bar 32, in the case of circuit breakers D1 and D2, and on the bus bar 30, in the case of circuit breakers F1 and F2. Therefore, it will be apparent that between the circuits established from the circuit breakers D1 and D2 there will be a maximum potential difference therebetween of only 115 volts and not 230 volts. The same is true in the case of circuits connected to circuit breakers F1 and F2. Assuming now that the unipolar double-pole circuit breaker D1—D2 controls two appliance circuits, for example, in a kitchen, if a person simultaneously touches two defective appliances, one on each circuit, he can obtain a maximum shock of only 115 volts, whereas if these appliances had been connected to a 115/230 volt three wire circuit, with each appliance being connected to a circuit breaker pole of opposite polarity, it would be apparent that a person simultaneously touching the two defective appliances would be subjected to the much more hazardous 230 volt electric shock.

Referring now to Fig. 2, it will be noted that handle extensions 62 are provided on each of the circuit breakers 18 except the one identified at C. Said arrangement includes the two unipolar double-pole circuit breakers D1—D2 and F1—F2, and the three bipolar double-pole circuit breakers A1—A2, B1—B2, and E1—E2, to constitute five double-pole circuit breakers, plus the single-pole circuit breaker C, making a total of six circuit breaker units. Therefore, there are no more than six circuit breaker units and not more than six over-current protection elements in any ungrouded conductor. This arrangement meets the requirements of the National Electric Code and of the Underwriters' Laboratories, Inc. for electric service equipment and therefore does not require the use of any separate disconnect mechanism, whether constituted by an additional switch, fuse or circuit breaker, in circuit between the entrance of the utility service lines and the apparatus in the enclosure 10.

The arrangement illustrated in Fig. 2 is particularly well adapted for serving seven separate loads. In this connection, a two circuit storage type electric water heater may have the separate off-peak lower heating element thereof connected to a separate circuit through the circuit breakers A1 and A2, and an emergency day rate upper heating element for said water heater may be connected across the conductors 52 and 54 through the circuit breakers B1—B2. In addition, an oil burner, stoker or a pilot control for a gas furnace may be connected through the single circuit breaker C. Two 2-wire lighting circuits may be connected through the circuit breakers D1 and D2, a 3-wire electric range circuit may be connected through the circuit breakers E1 and E2 and thereby cross the input conductors 52 and 54, and two 2-wire appliance circuits may be connected to the circuit breakers F1 and F2.

It will be understood that the arrangement illustrated in Fig. 2 is highly flexible and is readily adaptable to meet different or changed conditions. For example, if the previously described water heater is a single element device, rather than a two-element device, and operates therefore only on an off-peak circuit, which is separately connected through the circuit breakers A1—A2 as heretofore stated, the circuit breakers at B1 and B2 would be available for two separate lighting or appliance circuits. In another arrangement, the circuit breakers B1 and B2 may be replaced by breakers having a higher rating, such as for example a current rating of 50 amperes, and they may be used to supply a separate load center of at least 10 individual 2-wire branch circuits. In this connection it will be noted that, as previously stated, the circuit breakers B1 and B2 are of opposite polarity and are connected across the full input voltage so that they may very readily supply at least 10 single-pole circuit breakers connected at a load center remote from the control equipment contained in the enclosure 10.

In another possible arrangement, if an electric range is not used, the circuit breakers E1 and E2 are available for either of the previously described additional uses of the circuit breakers B1 and B2 since the circuit breakers E1 and E2 are also of opposite polarity and connected across the entire input voltage.

In another arrangement, an additional circuit breaker may be connected to bus bar 30 between the circuit breaker B2 and the circuit breaker C, and by providing said additional circuit breaker and the circuit breaker C with handle ties 62, said latter circuit breakers would constitute another unipolar double-pole circuit breaker for any suitalbe use.

In another possible arrangement, the bus bar 32 would be replaced by a bus bar similar to bus bar 30 to provide two additional circuits which are connected at the same side of the line through circuit breakers A1 and A2 which would now constitute a unipolar double-pole circuit breaker. In this connection, the circuit breakers B1—B2 could control the heating element of a storage type water heater of the single element type which does not require a separate off-peak circuit.

From the foregoing, it will be apparent that the service control equipment illustrated in Fig. 2 may provide many different types of arrangement to meet any particular circuit layout without requiring any major changes. At most, it will be necessary only to add an additional circuit breaker between B2 and C, or to replace bus bar 32 with another bus bar 30, as previously described to provide in excess of 50 different major circuit arrangements. It will be noted that through the use of the handle ties, as previously described, these arrangements will always meet the requirements of the National Electric Code and the Underwriters' Laboratories, Inc. by providing a maximum of six double-pole circuit breakers, whether of the unipolar or bipolar arrangement, or a lesser number of double-pole circuit breakers in combination with single-pole circuit breakers to make a total of six over-current protective elements in any ungrounded conductor and thereby eliminate the necessity for a separate disconnect means in advance of the service control equipment.

Figure 6:
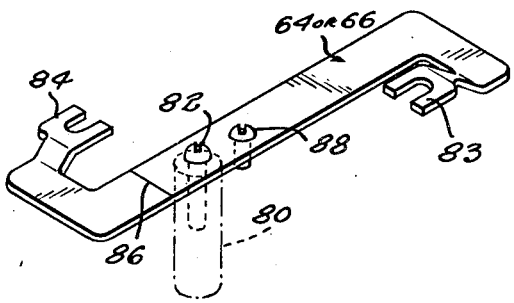
Fig. 6 illustrates a form of bus bar utilized with the embodiments of Figs. 4 and 5, and a mounting means for said bus bar.
Figure 7:
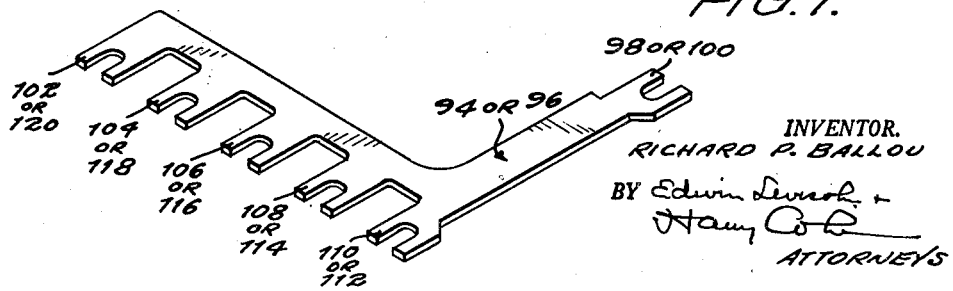
Fig. 7 is a perspective view illustrating another form of bus bar utilized in the embodiments of Figs. 4 and 5.

Referring now to Fig. 4, there is illustrated another arrangement of the service control equipment pursuant to the present invention. The various circuit breakers 18 are releasably mounted in any suitable manner on a panel or plate 12 carried by the rear wall 14 of the enclosure, as in Fig. 2. The circuit breakers in the upper row are paired at G1—G2, H1—H2 and I1—I2. Each of these circuit breakers is provided with a handle extension 62 to serve as a bipolar double pole circuit breaker for a main line circuit. Provision is made for the S-shaped bus bars 64 and 66 which are provided with the main line terminal connectors 68 and 70, respectively. As here shown, high voltage conductor 72 of a 3-wire electric supply circuit from the utility company is connected to terminal connector 68, the high voltage conductor 74 of said circuit being connected to terminal connector 70, and the grounded or neutral conductor 76 of said circuit being connected to the ground or terminal strip 78 mounted on the enclosure. The bus bars 64 and 66 are mounted on insulated posts 80 which are suitably supported on the bottom wall 14 of the enclosure, by any suitable means, such as screw 82, releasably securing the bus bar on the post, as illustrated in Fig. 6. The bus bars 64 and 66 are provided at their opposite ends with the branch terminal connector portions 83 and 84, respectively, it being noted that said connector portions are disposed symmetrically about the center line of the bus bar so that the latter may be rotated 180° for use either as a bus bar 64 or as a bus bar 66. In addition, it will be noted that said bus bars are provided with a scored line, as indicated at 86, for facilitating the removal of one end part thereof, as may be required, it being understood, however, that while both of the bus bars, as illustrated, have scored lines only one of said bus bars need be scored. In addition, the bus bars 64 and 66 are provided with a terminal screw or other connecting means 88 for facilitating the connection thereto of a suitable connector 90 or 92, which is preferably an insulated conductor. As here shown, the bus bar 64 interconnects the circuit breakers G2 and H1 for connecting them to the main line conductor 72. The bus bar 66 interconnects the circuit breakers H2 and I1 for connecting them to the main line conductor 74. The conductor 90 connects the circuit breaker I2 to the bus bar 64 and therefore to the conductor 72, and the conductor 92 connects the circuit breaker G1 to the bus bar 66 and therefore to the main line conductor 74.

Therefore, it will be apparent that the circuit breakers in the upper row of Fig. 4, each being provided with a handle tie 62, and each being of opposite circuit polarity from its companion circuit breaker, constitute three bipolar double-pole circuit breakers. More specifically, it will be noted that, in the bipolar double-pole circuit breaker G1—G2, the pole at G1 is connected through conductor 92 and bus bar 66 to the main line 74 and the companion pole at G2 is connected through bus bar 64 to the main line conductor 72 which is of opposite polarity from the conductor 74. In the bipolar double-pole circuit breaker H1—H2, the pole at H1 is connected through bus bar 64 to the main line conductor 72 and the pole at H2 is connected through bus bar 66 to the main line conductor 74. In the bipolar double-pole circuit breaker I1—I2, the pole at I1 is connected through bus bar 66 to the main line conductor 74 and the pole at I2 is connected through conductor 90 and bus bar 64 to the main line conductor 72

In the arrangement illustrated in Fig. 4, there are provided the bus bars 94 and 96, respectively, which are of similar construction, each being rotated 180° from the other. At one end the bus bar 94 is provided with the single branch terminal connector portion 98 and the bus bar 96 is provided with the similar single end terminal portion 100. At their opposite ends, respectively, the bus bar 94 is provided with the branch circuit connector portions 102, 104, 106, 108 and 110, and the bus bar 96 is provided with the similar end branch connector portions 112, 114, 116, 118 and 120. The bus bar 94 is connected through the end portion 98 thereof to the pole H1 of the bipolar double-pole circuit breaker H1—H2 and at its other end is connected to the single-pole circuit breakers J, K, L, M and N, as illustrated. It will be apparent that said single-pole circuit breakers are of the same polarity. The bus bar 96 is connected by the single end 100 thereof to the pole H2 of the bipolar double-pole circuit breaker H1—H2 and its other end is connected to the single-pole circuit breakers O, P, Q, R and S, the latter being of the same polarity and of opposite polarity from the single-pole circuit breakers connected to the bus bar 94. Therefore, it will be apparent that if handle extensions 62 are provided on the adjacent single-pole circuit breakers N and O, they would constitute a bipolar double-pole circuit breaker to control a 230 volt circuit.

In the arrangement indicated in Fig. 4, the apparatus is suitable for the control of a water heater from the bipolar double-pole circuit breaker G1—G2, for the control of separate light and appliance circuits through the single-pole circuit breakers J, K, L, M and N, through pole H1 of the bipolar double-pole circuit breaker H1—H2, and for the control of separate light and appliance circuits through the single-pole circuit breakers O, P, Q, R and S through the other pole H2 of the bipolar double-pole circuit breaker H1—H2. In addition, the bipolar double-pole circuit breaker I1—I2 may control an electric range.

Should a range or water heater not be used, the circuit breaker G1—G2 and/or the circuit breaker I1—I2 are available for any other desired purposes, either as individual single-pole circuit breakers or as bipolar double-pole circuit breakers, and in the latter use thereof they may serve a feeder circuit to a load center at a point remote from the entrance of the service equipment into the building.

In the arrangement illustrated, the apparatus in Fig. 4 is connected to supply a water heater directly from the same utility service meter as the balance of the equipment in the building. However, for a single element off-peak water heater which requires a separate circuit from a time switch at the meter, the circuit breakers G1 and G2 may be readily removed from the existing arrangement by breaking away the branch connector portion 84 from the bus bar 64, on the score line 86, and by disconnecting the conductor 92 from circuit breaker G1 and from the terminal screw 88 on the bus bar 66.

If the water heater is of the two element type and requires both a separate off-peak circuit and a connected day rate emergency circuit for lower and upper heating elements, respectively, this may readily be accomplished by using the bipolar double-pole circuit breaker G1—G2 for the off-peak or separate circuit, as described, and by providing the single pole circuit breakers N and O with handle ties 62 to provide a bipolar double-pole circuit breaker for the emergency circuit from the meter. However, if there is no provision for an electric range circuit, the bipolar double-pole circuit breaker I1—I2 may supply the water heater in place of the circuit breakers N and O. Similarly, if there is no range circuit, the bipolar double-pole circuit breaker I1—I2 may supply the branch or feeder circuit to a remote load center provided with 8 or 10 separate branch circuits.

It will be apparent that there are 10 major circuit arrangements which are possible through the use of the single-pole circuit breakers J through S, without including many possible combinations through the combined use of various of these single-pole circuit breakers and without using any of the circuit breakers in the upper row of the apparatus as single-pole circuit breakers.

Figure 5:
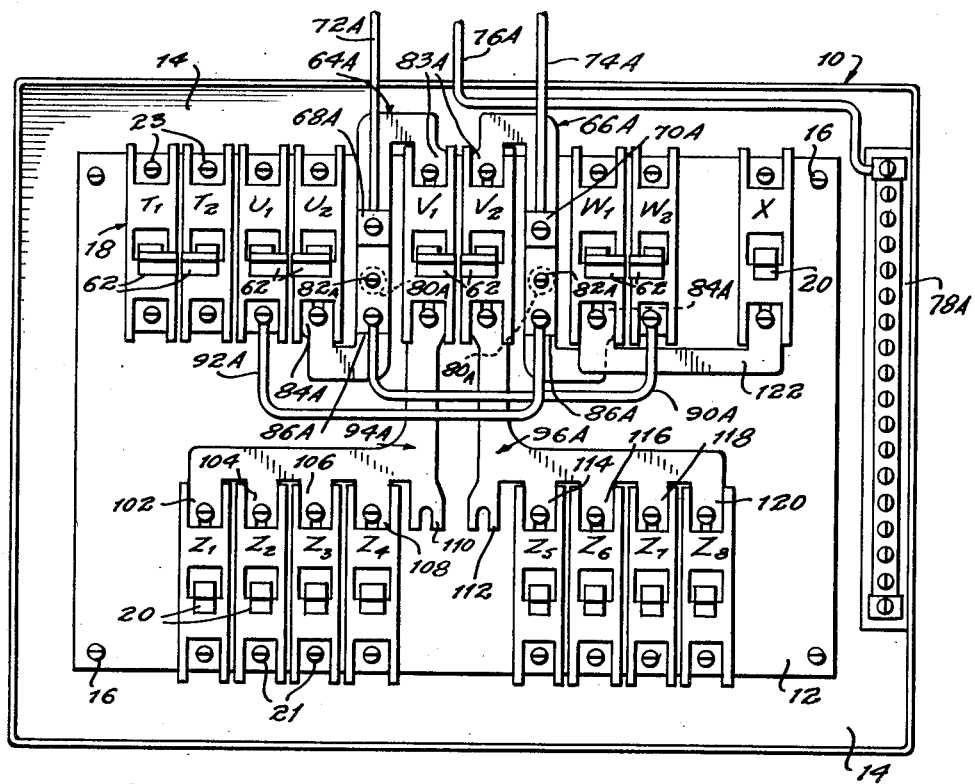
Fig. 5 is a view similar to Figs. 2 and 4, and illustrates an arrangement of circuit breakers and bus bars pursuant to still another embodiment of the invention.

Referring now to Fig. 5, there is shown a modification of the apparatus illustrated in Fig. 4 to provide a larger service control arrangement. The circuit breakers T1 and T2 are provided with handle ties 62 to provide a bipolar double pole circuit breaker for connection to the time switch in an electric meter to serve the lower off-peak heating element in an electric hot water heater, the circuit breakers at U1 and U2 also being provided with handle ties 62 to constitute a second bipolar double-pole circuit breaker U1—U2 connected directly to the meter to provide for the heating of the upper emergency day rate element of the hot water heater. As here shown, the apparatus is supplied by the main line conductors 72A and 74A which carry the high voltage of a conventional three wire electric circuit from the utility company, the conductor 76 being the ground or neutral line which is connected to a neutral bar 78A carried by the enclosure 10 in the same manner as in Figs. 2 and 4, it being understood that said enclosure is provided with a panel 12 on the rear wall 14 thereof, said panel being adapted to removably retain the circuit breakers as previously described with reference to Figs. 2 and 4. It will be noted that the high voltage conductor 72A is connected to the main line terminal connector 68A carried by the S-shaped bus bar 64A. The high voltage line 74A is similarly connected to a main line terminal connector 70A carried by the companion S-shaped bus bar 66A, which is rotated 180° from the bar bar 64A, in the manner previously described. Said bus bars are also provided with the previously described mounting posts 80A and securing screws 82A. The branch connector portion 84A of bus bar 64A is connected to the circuit breaker U2 and the branch connector portion 83A thereof is connected to the circuit breaker V1. Similarly, the branch connector portion 84A of the bus bar 66A is connected to the circuit breaker W1, the branch connector portion 83A thereof being connected to the circuit breaker V2. Therefore, it will be apparent that the circuit breakers V1 and V2 also constitute a bipolar double-pole circuit breaker, when provided with the handle ties 62, and are available to supply the lower row of circuit breakers Z1 through Z8 through the bus bars 94A and 96A connected to circuit breakers V1 and V2, respectively. The connector 92A connects circuit breaker U1 to bus bar 66A to provide for the opposite polarity connection in the bipolar double-pole circuit breaker U1—U2, and the conductor 90A similarly connects the circuit breaker W2 to the bus bar 64A to provide for the opposite polarity connection in the bipolar double-pole circuit breaker W1—W2. The latter double-pole circuit breaker is available for supplying an electric range and the single-pole circuit breaker at X, which is connected to pole W1 of the double-pole circuit breaker W1—W2 through a bus bar 122, is available for a sub-feed if required. For example, the single-pole circuit breaker at X may be used for a furnace circuit. In the event that the single-pole circuit breaker X is provided with another single-pole circuit breaker so as to be used as a bipolar double-pole circuit breaker, the additional single-pole circuit breaker could be connected to the leg W2 of the double-pole circuit breaker W1—W2 through a suitable connector.

If an off-peak water heater circuit is not desired in this particular arrangement, the bipolar double-pole circuit breaker T1—T2 may be connected to the bus bars 64A and 66A, respectively, by suitable connectors, such as for example by connectors similar to 122. The number of combinations possible with the arrangement shown in Fig. 5 includes all of the combinations illustrated in connection with Fig. 4 and many additional combinations which will be readily apparent to those skilled in the art.

With reference to Figs. 4 and 5, it will be noted that the bus bars 64 and 66, and 64A and 66A, are so shaped as to provide load connections on the outside, or top end, for the two pairs of circuit breakers on either side of the center pair, while the center pair has its load connection on the lower or inside position through which, through the use of the buses 94 and 96 or 94A and 96A, said center pair can feed at least 10 other single-pole circuit breakers. Load connections arranged in this manner on the outside of the approximate square presented by the arrangement of the upper and lower row of circuit breakers, simplifies the connection of the service equipment to the various circuits, since in every case the particular load terminal of the circuit breaker is an outside terminal thereof.

While I have shown and described the preferred embodiment of my invention, it will be understood that various changes may be made in the present invention without departing from the underlying idea or principles of the invention within the scope of the appended claim.

Having thus described my invention, what I claim and desire to secure by Letters Patent, is:

In a panelboard of the character described, a pair of bus bars each having a connector at each end thereof and a connector intermediate the ends thereof adapted for connection to a power line, a first and a second automatic circuit breaker each provided with a handle extension, said circuit breakers being in juxtaposition to each other so as to permit concomittant manual operation of their handle extensions, each of said circuit breakers having a load terminal and a line terminal, the line terminal of said first breaker being connected to one end of one of said bus bars and the line terminal of said second breaker being connected to the corresponding end of the other bus bar, a third and a fourth automatic circuit breaker each provided with a handle extension, said third and fourth circuit breakers being in juxtaposition to each other so as to permit concomitant manual operation of their handle extensions, each of said third and fourth circuit breakers having a load terminal and a line terminal, the line terminal of said third circuit breaker being connected to the other end of said one bus bar and the line terminal of said fourth circuit breaker being connected to the other end of the other bus bar whereby with said intermediate connectors connected to power lines of opposite polarity, respectively, said first and second circuit breakers will be of opposite polarity and said third and fourth circuit breakers will be of opposite polarity, and an additional pair of bus bars, each of said additional bus bars having a single connector at one end thereof and a plurality of connectors at the other end thereof, the single connector of one of said additional bus bars being connected to the load terminal of said first circuit breaker and the single connector of the other of said additional bus bars being connected to the load terminal of said second circuit breaker, whereby the plurality of connectors of each of said additional pair of bus bars is available for connection to the respective line terminals of branch-circuit circuit breakers.

References Cited in the file of this patent

UNITED STATES PATENTS

| | | |
|---|---|---|
| Re. 19,887 | Jennings | Mar. 10, 1936 |
| Re. 23,156 | Robertson et al. | Oct. 18, 1949 |
| 476,970 | Arnold | June 14, 1892 |
| 842,110 | Paiste | Jan. 22, 1907 |
| 1,244,099 | Kneisel | Oct. 23, 1917 |
| 1,553,952 | Nero | Sept. 15, 1925 |
| 1,557,248 | Gernsback | Oct. 13, 1925 |
| 1,691,422 | Aalborg | Nov. 13, 1928 |
| 1,856,423 | Olley | May 3, 1932 |
| 1,958,916 | Hammerly | May 15, 1934 |
| 2,023,070 | Goldsborough | Dec. 3, 1935 |
| 2,099,585 | Von Hoorn | Nov. 16, 1937 |
| 2,132,630 | Jackson | Oct. 11, 1938 |
| 2,214,065 | Pennock | Sept. 10, 1940 |
| 2,261,987 | Frank et al. | Nov. 11, 1941 |
| 2,262,712 | Shenton | Nov. 11, 1941 |
| 2,282,520 | Jackson | May 12, 1942 |
| 2,439,165 | Graves | Apr. 6, 1948 |
| 2,440,824 | Jackson | May 4, 1948 |
| 2,523,725 | Schmidt | Sept. 26, 1950 |
| 2,542,533 | Johansson | Feb. 20, 1951 |
| 2,543,410 | Jensen | Feb. 27, 1951 |
| 2,544,180 | Richards | Mar. 6, 1951 |

FOREIGN PATENTS

| | | |
|---|---|---|
| 451,302 | Great Britain | Aug. 4, 1936 |